(12) United States Patent
Wang et al.

(10) Patent No.: US 6,724,516 B2
(45) Date of Patent: Apr. 20, 2004

(54) ROBUST MULTI-LAYERED THIN-FILM MEMBRANE FOR MICRO-ELECTROMECHANICAL SYSTEMS (MEMS) PHOTONIC DEVICES

(75) Inventors: Gaofeng Wang, Sunnyvale, CA (US); Naiqian Han, Cupertino, CA (US); Liji Huang, San Jose, CA (US)

(73) Assignee: Intpax, Inc., Cupertino, CA (US)

( * ) Notice: Subject to any disclaimer, the term of this patent is extended or adjusted under 35 U.S.C. 154(b) by 2 days.

(21) Appl. No.: 10/062,774

(22) Filed: Feb. 1, 2002

(65) Prior Publication Data

US 2003/0045036 A1 Mar. 6, 2003

Related U.S. Application Data

(60) Provisional application No. 60/317,721, filed on Sep. 6, 2001.

(51) Int. Cl.[7] .................... G02B 26/00; G02B 1/10; G02F 1/00; H01L 21/00
(52) U.S. Cl. .................. 359/291; 359/321; 359/586; 359/588
(58) Field of Search ................. 359/291, 321, 359/580, 586, 588; 216/13, 24; 438/29

(56) References Cited

U.S. PATENT DOCUMENTS 5,999,322 A * 12/1999 Cushing ............... 359/589

* cited by examiner

Primary Examiner—David N. Spector
(74) Attorney, Agent, or Firm—Bo-In Lin

(57) ABSTRACT

This invention discloses a configuration of thin-film membrane. This thin-film membrane is freestanding, movable, and made of multiple layers of different materials such as silicon nitride, polycrystalline silicon or the combination of these two. This thin-film membrane can be actuated by external controlling forces such as electrostatic force. This thin-film membrane consists of odd number of layers, e.g., 1 layer, 3 layers, 5 layers, . . . , etc. Moreover, the layer profile of this membrane is symmetric, e.g., the bottommost layer is made to be identical to the topmost layer, the next bottommost layer is made to be identical to the next topmost layer, so on and so forth.

20 Claims, 3 Drawing Sheets

ROBUST MULTI-LAYERED THIN-FILM MEMBRANE FOR MICRO-ELECTROMECHANICAL SYSTEMS (MEMS) PHOTONIC DEVICES

This Application claims a priority date of Sep. 6, 2001 benefited from a previously filed Provisional Patent Application 60/317,721 filed on Sep. 6, 2001 by the Applicants of this Formal Patent Application.

BACKGROUND OF THE INVENTION

1. Field of the Invention

This invention relates generally to apparatus and methods for manufacturing optical and photonic devices for fiber optical signal transmission systems. More particularly, this invention is related to robust multiple-layered thin film membrane for configuring and manufacturing micro-opto-electro-mechanical systems (MOEMS) and micro-electro-mechanical systems (MEMS) devices for use in wide-band optical communication sub-system or system.

2. Description of the Related Art

Next generation wide-band optical communication system requires a significant scale-down and low cost from today's standards, which are based on the components manufactured by mechanical methods. Recent development in silicon based MOEMS and MEMS devices has provided possible pathway to design photonic devices which meet the scaling and cost requirements for the next generation optical system. However, the freestanding multiple-layered thin-film membrane, which is design to achieve desired optical property, often suffer deformations due to mismatches of mechanical or thermal properties among different layers. The deformations could become more severe during device operation because of imposed forces or temperature variations. These deformations can severely degrade the optical and mechanical performances of MOEMS and MEMS devices. The deformations may also cause some electrical hazards such as electrostatic discharge (ESD) and electrical shorts.

Referring to FIGS. 1A and 1B for the deformations that occur in typical freestanding thin-film membrane. In FIG. 1A, a deformation occurs in a two-layered freestanding membrane. The deformations at the edges are caused by the mismatches of material properties between two layers. Referring to FIG. 1B for the deformation of a movable three-layered thin-film membrane where the three layers are formed with non-symmetrical layer profile. The deformation at the edges is caused by differential mismatches between the material properties of the non-symmetrical layers of the top and bottom layers.

Therefore, a need still exists in the art in the field of the optical signal transmission systems to provide a configuration and method of manufacture to provide MOEMS and MEMS devices such that the limitations encountered by current configuration of freestanding multi-layered thin-film membrane can be overcome.

SUMMARY OF THE PRESENT INVENTION

It is therefore an object of the present invention to provide new and improved configuration and methods for manufacturing MOEMS and MEMS devices without tangible deformations of freestanding multi-layered thin-film membranes. With the new and improved structural configurations, the limitations and difficulties of the prior art can be resolved. The present invention provides a systemic design methodology to eliminating/relieve the deformations of freestanding multi-layered thin-film membranes used in MOEMS and MEMS devices.

Briefly, in a preferred embodiment, this invention discloses a configuration of thin-film membrane. This thin-film membrane is freestanding, movable, and made of multiple layers of different materials such as silicon nitride, polycrystalline silicon or the combination of these two. This thin-film membrane can be actuated by external controlling forces such as electrostatic force. This thin-film membrane consists of odd number of layers, e.g., 1 layer, 3 layers, 5 layers, . . . , etc. Moreover, the layer profile of this membrane is symmetric, e.g., the bottommost layer is made to be identical to the topmost layer, the next bottommost layer is made to be identical to the next topmost layer, so on and so forth.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 2:
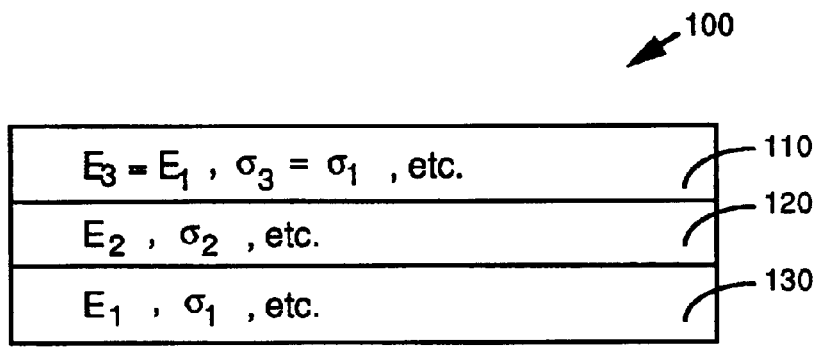
FIG. 2 is a cross sectional view of a three-layer thin film membrane with symmetrical layer profile.

Referring to FIG. 2 for a side cross sectional view of a movable three-layered thin-film membrane 100 that can be implemented in an MOEMS cavity (not shown). The three-layered membrane 100 has a top and bottom layers 110 and 130 and these layers have symmetrical layer structure. The material properties, e.g., Young's modulus, residual stress, thermal expanding coefficient, and thickness of layers, of layers 110 and 130 are symmetrical to the center layer 120. The symmetrical layer structure as shown in FIG. 2 will provide a freestanding membrane that has a robust flat surface as will be further explained below.

As shown in FIG. 2, the 3-layer membrane 100 has the top layer 110 formed with polysilicon with tensor residual stress $\sigma_1$=33 MPa and thickness $d_1$=3 um. The middle layer 120 is silicon nitride layer that has a tensor residual stress $\sigma_2$=102 MPa and thickness $d_2$=1.45 um. The bottom layer 130 is also a polysilicon layer with tensor residual stress $\sigma_3$=33 MPa and $d_3$=3 um. This layer profile forms a symmetrical structure since layer 110 and layer 130 have the same thickness 3 um and are made of same material with young's modulus E=165 GPa and stressed with the same amount of tensor 33 MPa. The detail dynamic analysis can be described in the following way:

First, as one layer in the membrane is bent, the bent layer asserts a stress gradient onto the surface of the membrane. The stress gradient if not canceled or compensated would cause a deformation of the membrane surface. The curvature radius R can be calculated as $R=E/(d\sigma/dz)$. Then, for a membrane of multiple layer structure, a surface curvature and deformation is generated by the stress gradients due to differences of residual stress and Young's modulus between the inter-layer contacting interfaces. For membrane 100 with symmetrical layer structure, since the top and bottom layers 110 and 130 have same initial stress gradients and the same differences of Young's modulus across these two contacting interfaces. The induced stress gradients for layer 110 and 130 will be the same across the two contacting interfaces, which result in the same curvature radii but in opposite directions. For the bottom layer 130, the curvature is for buckling up and the curvature of the top layer 110 is for buckling down. The combined effects lead to a flat surfaced membrane structure. Similarly, thermal analysis can briefly be explained as follows. When temperature changes, thermal stress gradients will be induced on the two layer contacting interfaces, which result in buckling tendency of the membrane. The buckling effects due to layer 110 and layer 130, however, are canceled out each other completely, since they have the same amplitude but in the opposite directions. Therefore, the net effects of mechanical and thermal stresses are canceled out in a symmetrical layer structure for the membrane 100 and a flat surface is produced for the freestanding membrane.

Figure 3:
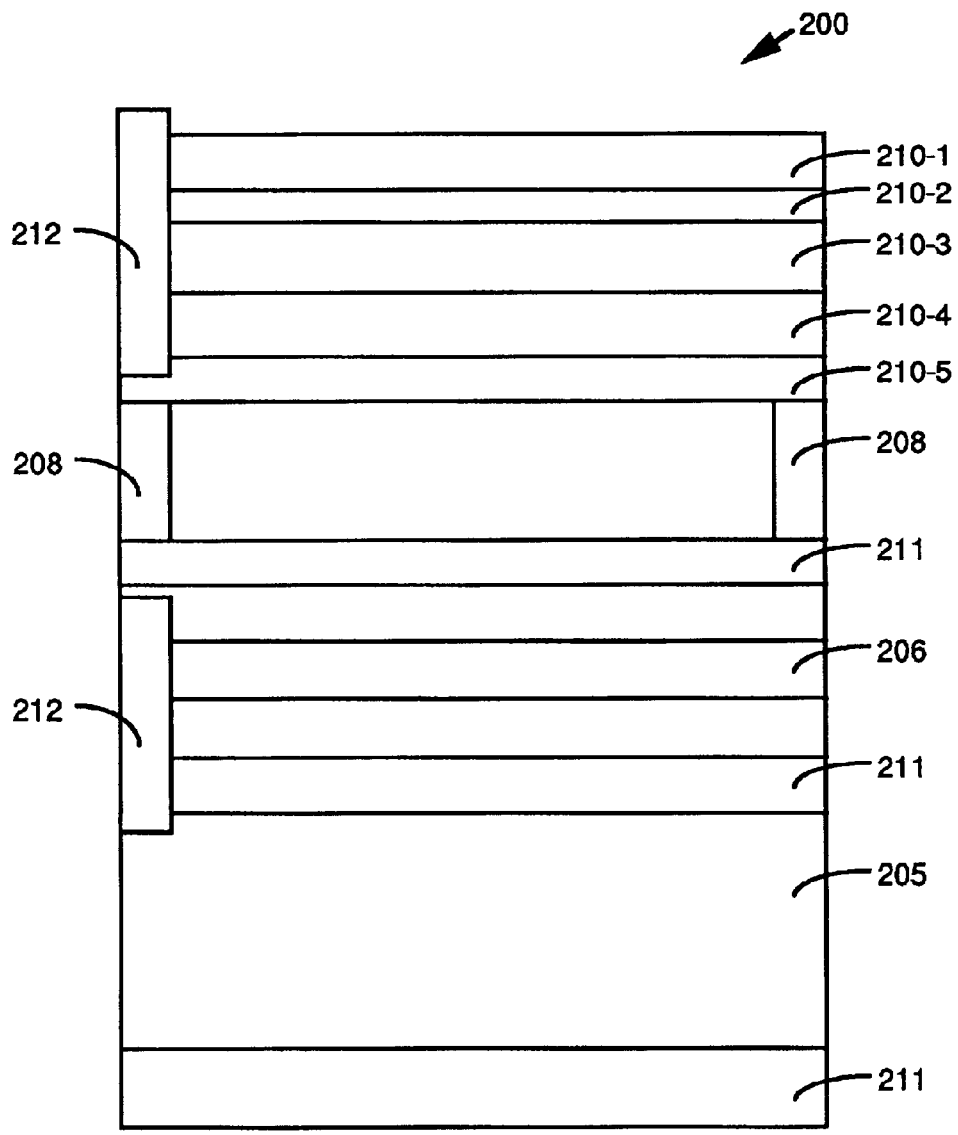
FIG. 3 is a cross sectional view of a five-layer thin film membrane with symmetrical layer profile.

FIG. 3 shows another membrane with symmetrical layer structure of five layers for an optical device 200. An optical cavity is supported by a spacer 208 on a substrate 205 covered by a membrane 210 of five layers 210-1 to 210-5. Layers 210-1 and 210-5, layers 210-2 and 210-4, are formed with same material composition, thickness and shape. A symmetrical layer structure provides the benefits to minimize membrane deformations caused by mechanical or thermal variations on a freestanding membrane that explained above. Symmetrical layers that have gradient curvatures of opposite directions substantially cancel the mechanical and thermal stresses of one another. The optical device 200 also includes AR and HR coatings 211 and 208 and electrodes 212 to move the membrane 210.

Figure 1A:
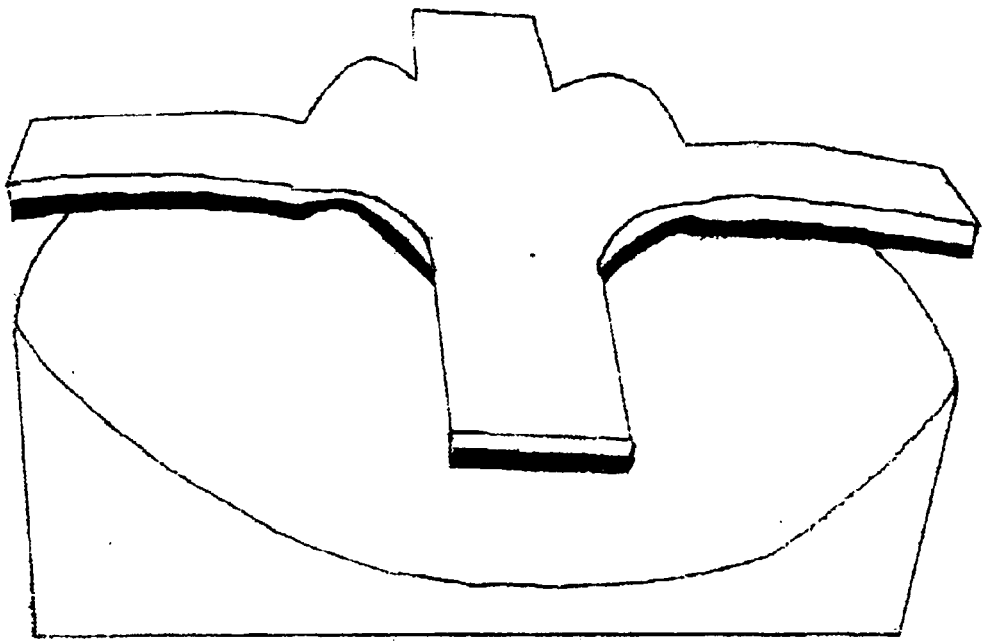
FIG. 1A shows simulation result for deformation of a prior art two-layer movable thin-film membrane.
Figure 1B:
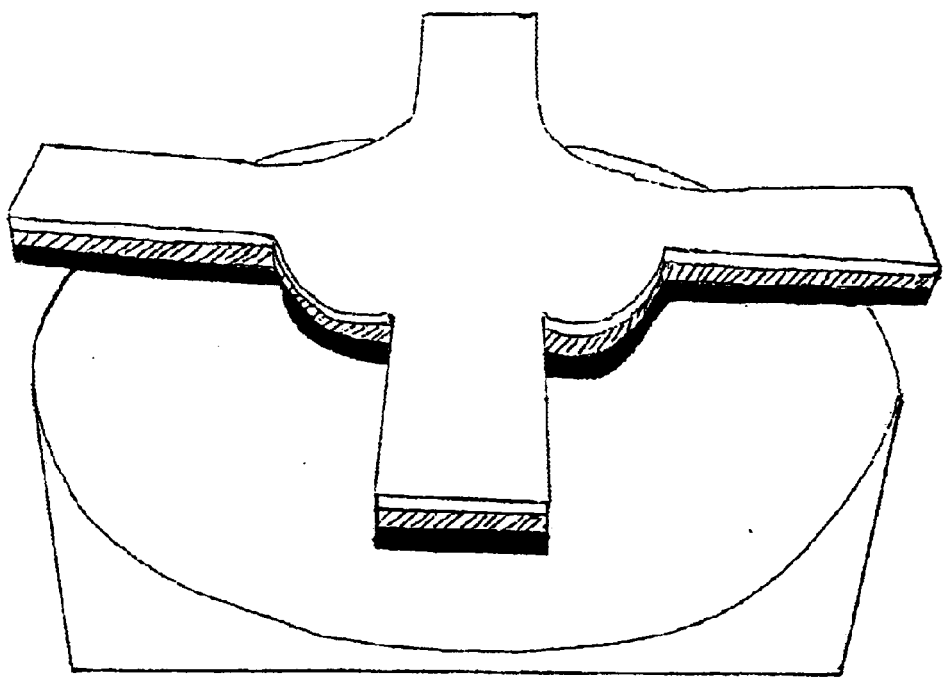
FIG. 1B shows simulation result for deformation of a prior art three-layer movable thin-film membrane.
Figure 4A:
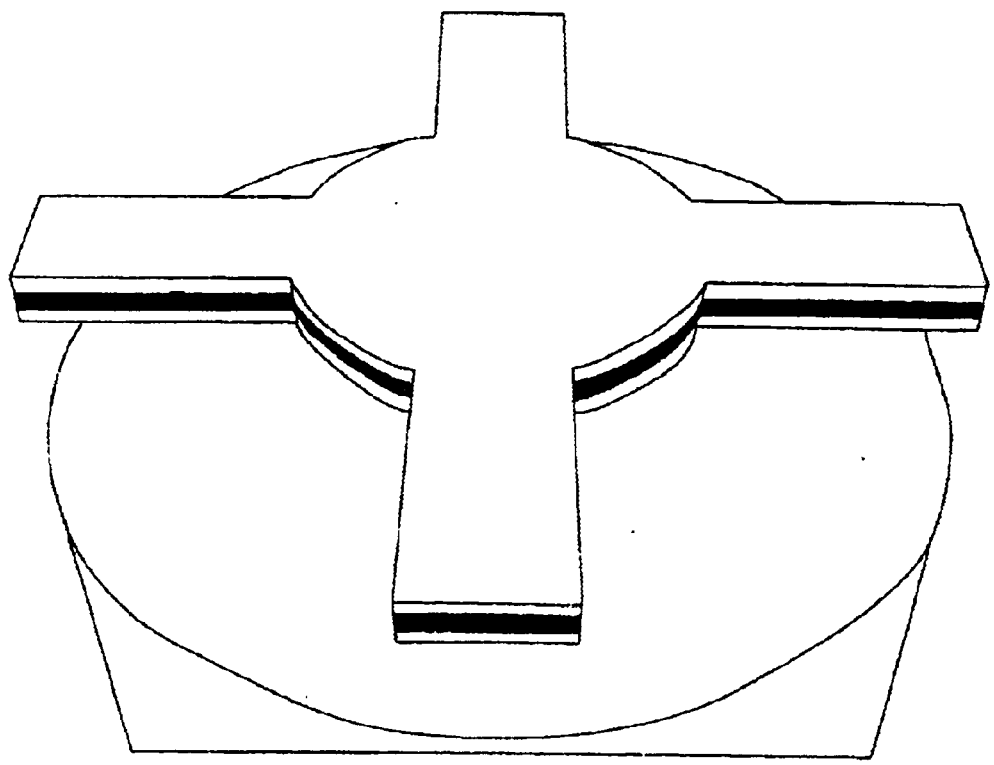
FIGS. 4A and 4B show analysis result for deformation of a movable three-layer thin-film membrane of this invention.
Figure 4B:
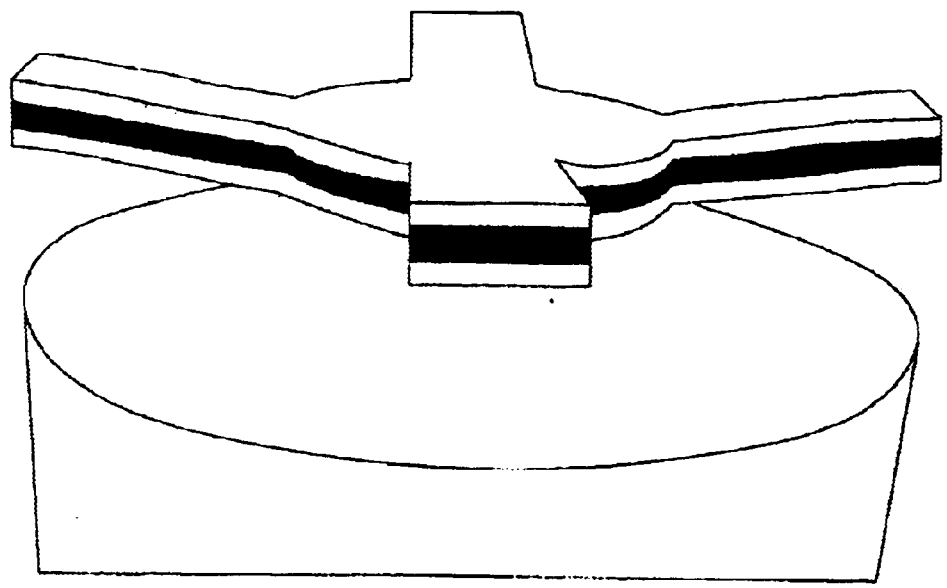

FIGS. 4A and 4B are perspective view of a membrane formed with three symmetrical layers as that shown in FIG. 2. Under a freestanding condition, compared to FIGS. 1A and 1B, the three-layer membrane has minimal deformation on the edges. FIG. 4B shows the surface profile after an electrostatic force is applied onto the membrane. Again, the membrane surface is kept flat with no observable deformations on the edges.

Therefore, based on above drawings and descriptions, this invention discloses an optical device. The optical device includes a freestanding membrane comprising a plurality of thin-film layers represented by L(i), i=1, 2, 3, . . . , N where N is a positive odd integer. The membrane has a mirror symmetrical layer structure relative to a middle layer L(m) where m=(N+1)/2, and layer L(m−j) and layer L(m+j) having a same thickness, material composition, shape and size, where j=1, 2, 3, . . . ,(N−1)/2. In a preferred embodiment, the device further includes an electromagnetic means for controlling and moving the freestanding membrane. In another preferred embodiment, the layers L(i) having an alternate high-low refraction index configuration with layers $L(i_H)$ having a set of relatively higher refraction indexes and layers $L(i_L)$ having a set of relatively lower refraction indexes where $i_H$=1, 3, 5, N and $i_L$=2, 4, 6, . . . , (N−1). In another preferred embodiment, the layers L(i) having an alternate high-low refraction index configuration with layers $L(i_H)$ having a set of relatively higher refraction indexes and layers $L(i_L)$ having a set of relatively lower refraction indexes where $i_L$=1, 3, 5, . . . ,N and $i_H$=2, 4, 6, . . . , (N−1). In another preferred embodiment, the optical device further includes a resonant cavity supported on a silicon substrate covered by the freestanding membrane. In another preferred embodiment, the optical device further includes an antireflection (AR) layer coated on the bottom of the silicon substrate.

In essence, this invention further discloses a freestanding membrane. The membrane includes a plurality of thin-film layers represented by L(i), i=1, 2, 3, . . . , N where N is a positive odd integer. The thin film layers having a mirror symmetrical layer structure relative to a middle layer L(m) where m=(N+1)/2, and layer L(m−j) and layer L(m+j) having a same thickness, material composition, shape and size, where j=1, 2, 3, . . . ,(N−1)/2.

According to the drawings and descriptions, this invention further discloses a method for manufacturing an optical device. The method includes steps of a) forming a freestanding membrane with a plurality of thin-film layers represented by L(i), i=1, 2, 3, . . . , N where N is a positive odd integer. The method further includes a step of b) configuring the thin film layers with a mirror symmetrical layer structure relative to a middle layer L(m) where m=(N+1)/2, and layer L(m−j) and layer L(m+j) having a same thickness, material composition, shape and size, where j=1, 2, 3, . . . ,(N−1)/2. In a preferred embodiment, the method further includes a step of c) controlling and moving the freestanding membrane with an electromagnetic means.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An optical device comprising:

a deformable membrane comprising a plurality of thin-film layers represented by L(i), i=1, 2, 3, . . . , N where N is a positive odd integer; and said deformable membrane having a mirror symmetrical layer structure relative to a middle layer L(m) where m=(N+1)/2, and layer L(m−j) and layer L(m+j) having a same stress response-characteristic during a membrane deformation, where j=1, 2, 3, . . . ,(N−1)/2.

2. The optical device of claim 1 further comprising:

an means for deforming said membrane.

3. The optical device of claim 1 wherein:

said layers L(i) having an alternate high-low refraction index configuration with layers $L(i_H)$ having a set of relatively higher refraction indexes and layers $L(i_L)$ having a set of relatively lower refraction indexes where $i_H$=1, 3, 5, N and $i_L$=2, 4, 6, . . . , (N−1).

4. The optical device of claim 1 wherein:

said layers L(i) having an alternate high-low refraction index configuration with layers $L(i_H)$ having a set of relatively higher refraction indexes and layers $L(i_L)$ having a set of relatively lower refraction indexes where $i_L$=1, 3, 5, N and $i_H$=2, 4, 6, . . . , (N−1).

5. The optical device of claim 1 further comprising:

a resonant cavity supported on a silicon substrate covered by said membrane.

6. The optical device of claim 5 further comprising:

an antireflection (AR) layer coated on the bottom of said silicon substrate.

7. The optical device of claim 1 wherein:

at least one of said layers L(i), i=1, 2, 3, . . . N, is a polysilicon layer.

8. The optical device of claim 1 wherein:

at least one of said layers L(i), i=1, 2, 3, . . . N, is a silicon nitride layer.

9. The optical device of claim 1 further comprising:

a HR coating layer coated on said membrane.

10. A deformable membrane manufactured by a micro-opto-electromechanical-system (MOEMS) technology comprising:

a plurality of thin-film layers represented by L(i), i=1, 2, 3, . . . , N where N is a positive odd integer; and said thin film layers having a mirror symmetrical layer structure relative to a middle layer L(m) where m=(N+1)/2, and layer L(m−j) and layer L(m+j) having a same stress response-characteristic during a membrane deformation where j=1, 2, 3, . . . ,(N−1)/2.

11. An method for manufacturing an optical device comprising:

forming a deformable membrane with a plurality of thin-film layers represented by L(i), i=1, 2, 3, . . . , N where N is a positive odd integer; and configuring said thin film layers with a mirror symmetrical layer structure relative to a middle layer L(m) where m=(N+1)/2, and layer L(m−j) and layer L(m+j) having a same stress response-characteristic during a membrane deformation, where j=1, 2, 3, . . . ,(N−1)/2.

12. The method of claim 11 further comprising:

deforming said membrane with an membrane-deforming means.

13. The method of claim 11 wherein:

said step of configuring said thin film layers further comprising a step of configuring said layers L(i) with an alternate high-low refraction index configuration with layers $L(i_H)$ having a set of relatively higher refraction indexes and layers $L(i_L)$ having a set of relatively lower refraction indexes where $i_H$=1, 3, 5, N and $i_L$=2, 4, 6, . . . , (N−1).

14. The method of claim 11 wherein:

said step of configuring said thin film layers further comprising a step of configuring said layers L(i) with an alternate high-low refraction index configuration with layers $L(i_H)$ having a set of relatively higher refraction indexes and layers $L(i_L)$ having a set of relatively lower refraction indexes where $i_L$=1, 3, 5, N and $i_H$=2, 4, 6, . . . , (N−1).

15. The method of claim 11 further comprising:

supporting a resonant cavity on a silicon substrate and covering said resonant cavity with said deformable membrane.

16. The method of claim 11 further comprising:

coating an antireflection (AR) layer on the bottom of said silicon substrate.

17. The method of claim 11 wherein:

said step of configuring said thin-film layers further comprising a step of forming a polysilicon layer for at least one of said layers L(i), i=1, 2, 3, . . . N.

18. The method of claim 11 wherein:

said step of configuring said thin-film layers further comprising a step of forming a silicon nitride layer for at least one of said layers L(i), i=1, 2, 3, . . . N.

19. The method of claim 11 further comprising:

coating a HR coating layer on said membrane.

20. A method of forming a deformable membrane by using a micro-opto-electromechanical-system (MOEMS) technology comprising:

forming a plurality of thin-film layers represented by L(i), i=1, 2, 3, . . . , N where N is a positive odd integer; and configuring said thin film layers with a mirror symmetrical layer structure relative to a middle layer L(m) where m=(N+1)/2, and layer L(m−j) and layer L(m+j) having a same stress response-characteristic during a membrane deformation, where j=1, 2, 3, . . . ,(N−1)/2.

* * * * *